March 17, 1925.

E. G. OSZMAN

CONFECTIONERY CUTTING MACHINE

Filed May 5, 1923

Inventor
Edward G. Oszman
By his Attorneys
Merchant and Rigor

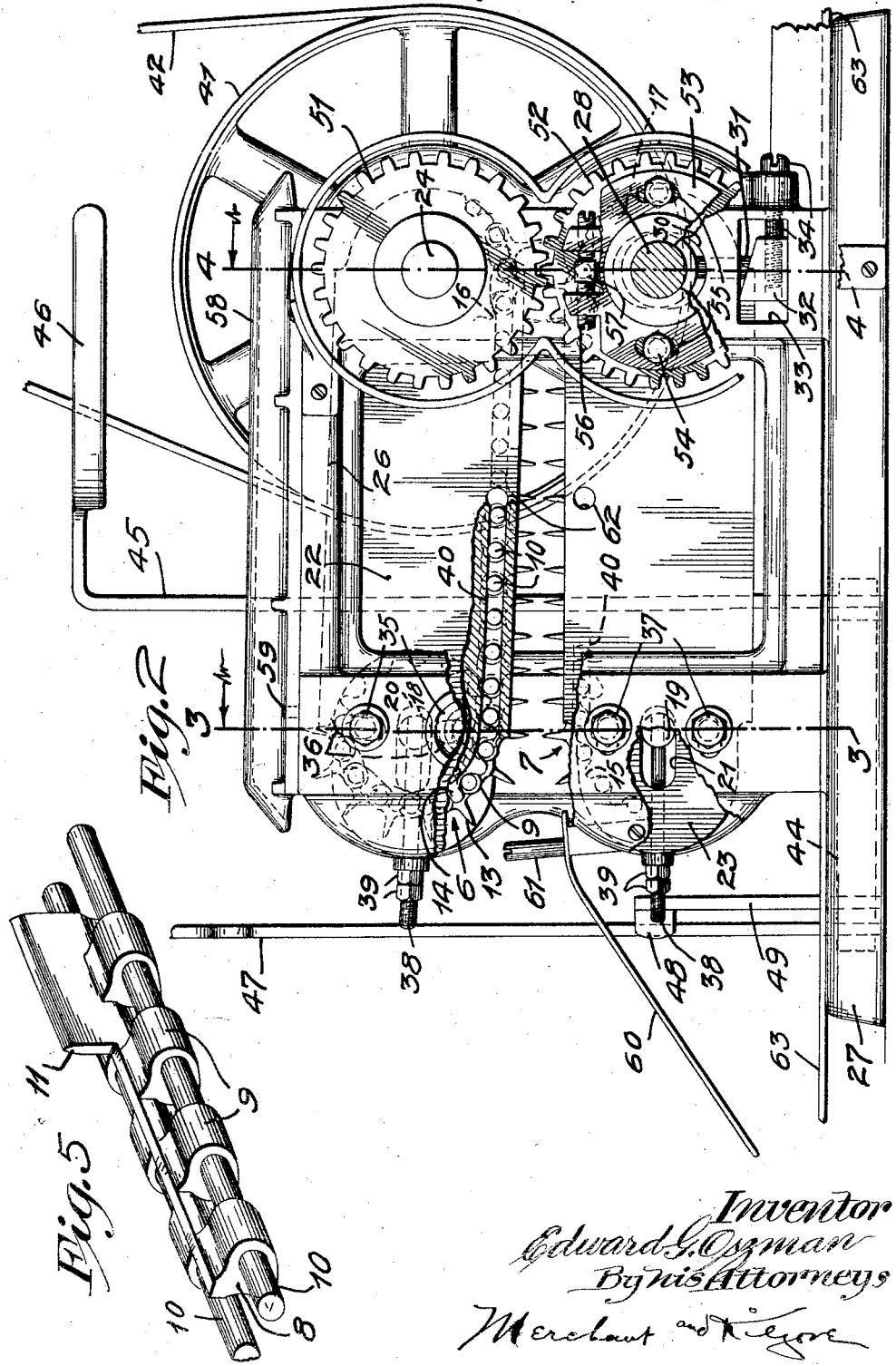

March 17, 1925.

E. G. OSZMAN

CONFECTIONERY CUTTING MACHINE

Filed May 5, 1923

Inventor
Edward G. Oszman
By his Attorneys
Merchant and Lyon

Patented Mar. 17, 1925.

1,530,318

UNITED STATES PATENT OFFICE.

EDWARD G. OSZMAN, OF MINNEAPOLIS, MINNESOTA.

CONFECTIONERY-CUTTING MACHINE.

Application filed May 5, 1923. Serial No. 636,834.

*To all whom it may concern:*

Be it known that I, EDWARD G. OSZMAN, a citizen of the United States, residing at Minneapolis, in the county of Hennepin and State of Minnesota, have invented certain new and useful Improvements in Confectionery-Cutting Machines; and I do hereby declare the following to be a full, clear, and exact description of the invention, such as will enable others skilled in the art to which it appertains to make and use the same.

My present invention relates to confectionery cutting machines for cutting a strip of candy or other semi-plastic material into relatively short pieces of a given size, and has for its object to improve the same in the several particulars hereinafter noted.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 2 is a view in right side elevation with some parts broken away and sectioned;

Fig. 5 is a perspective view of one of the cutting blade-equipped link bars and the two hinge pins therefor.

Figure 1:
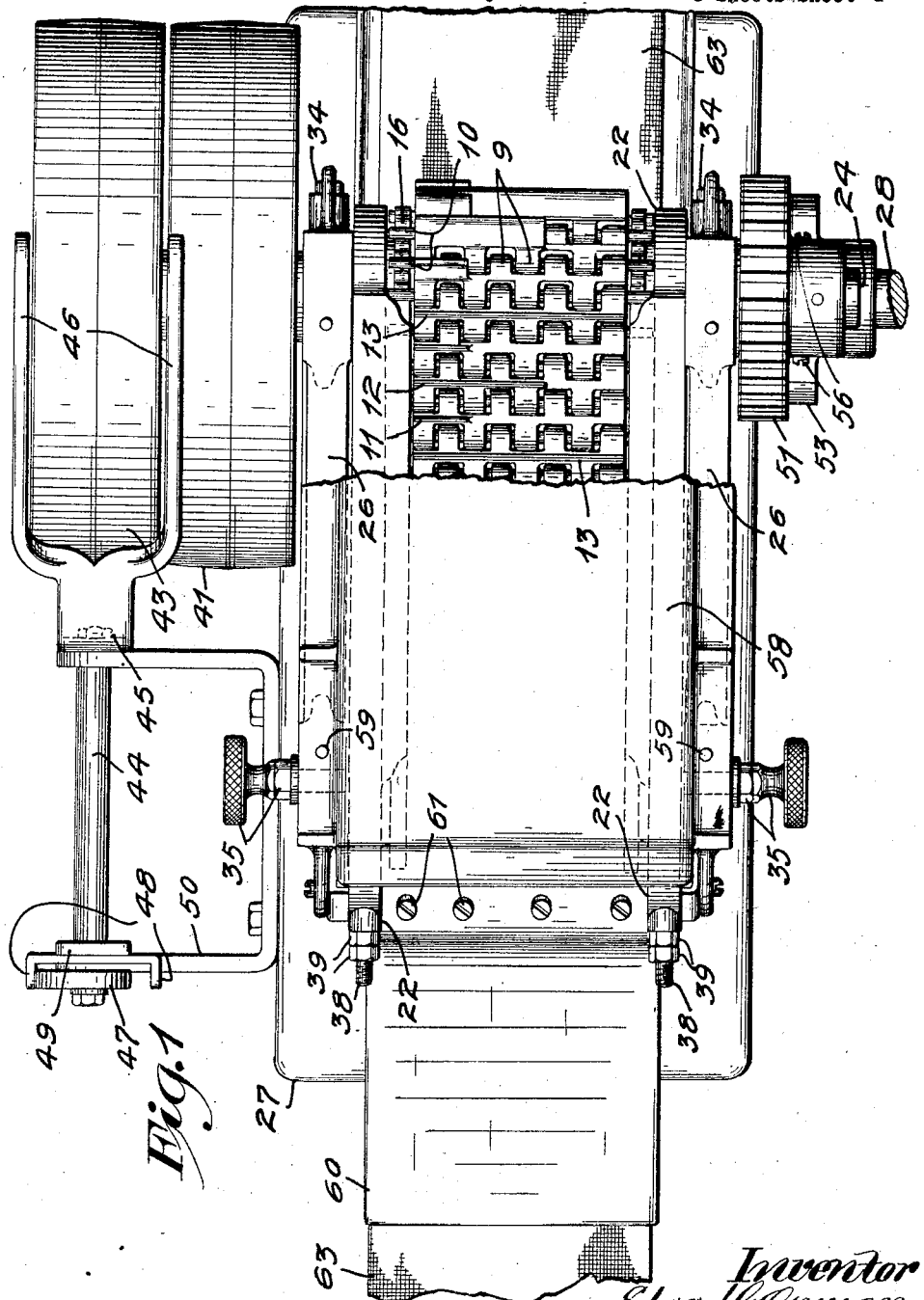
Fig. 1 is a plan view of the invention with some parts broken away.
Figure 4:
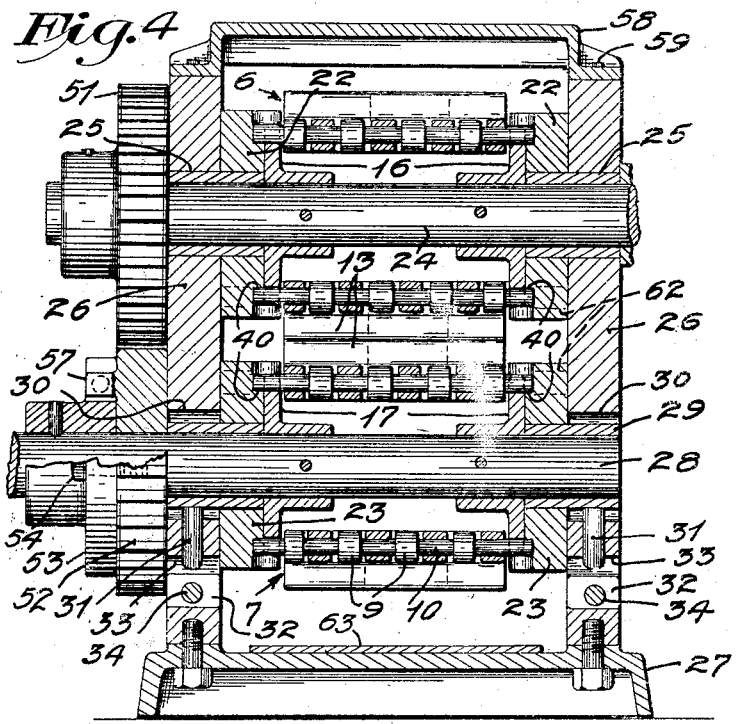
Fig. 4 is a transverse vertical section taken on the line 4—4 of Fig. 2.
Figure 3:
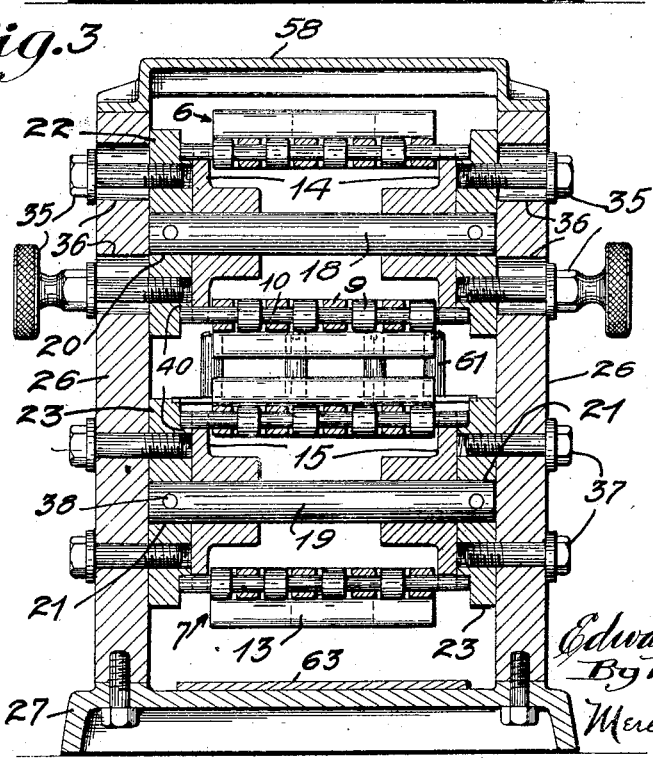
Fig. 3 is a transverse vertical section taken on the line 3—3 of Fig. 2.

The numerals 6 and 7 indicate, respectively, upper and lower horizontally disposed endless link belts, the links of which are in the form of bars 8 having formed on each of their sides a plurality of endwise spaced hinge lugs 9. Said hinge lugs 9, on each bar 8, extend between the hinge lugs 9 of adjacent link bars 8 and are flexibly connected thereto by hinge pins 10 that are free for removal therefrom by endwise sliding movement. It is important to note that the ends of said hinge pins project outward of the ends of the hinge bars 8 for a purpose that will presently appear. It will also be noted that the hinge lugs 9 on one side of each bar 8 are staggered in respect to the hinge lugs on the other side thereof to permit the link bars 8 to be assembled in the belts by turning either end thereof toward a given side of the belts.

Formed with the link bars 8 are outwardly projecting cutting blades 11, 12 and 13 having sharp cutting edges, and the cutting blades at the opposing faces of the belts 6 and 7 are arranged to travel in cooperating pairs. All of the blades 11, 12 and 13 extend from the left-hand ends of the link bars 8, and the cutting blades 11 extend substantially one-third of the full length of the respective link bars 8, the cutting blades 12 extend substantially two-thirds of the full length of the respective link bars 8, and the cutting blades 13 extend the full length of the respective link bars 8. The link bars 8 are secured in the belts so that their cutting blades 11, 12 and 13 are arranged to afford longitudinally spaced cutting portions. It will thus be seen that the cutting blades 11, 12 and 13 all cooperate at the left-hand side of the belts 6 and 7 to cut relatively short pieces of candy, while the cutting blades 12 and 13 cooperate at the intermediate portion of said belts to cut medium lengths of candy, and the blades 13 at the right-hand side of the belts cooperate to cut relatively long pieces of candy.

The belts 6 and 7 are driven by causing the end portions of their hinge pins 10 to run over upper and lower pairs of idle sprocket wheels 14 and 15, respectively, at the receiving end of the machine and over upper and lower pairs of driven sprocket wheels 16 and 17, respectively, at the delivery end of the machine. The idle sprocket wheels 14 and 15 are loosely journaled on upper and lower shafts 18 and 19, respectively, the ends of which are mounted in horizontal slots 20 and 21, respectively, in the rear end portions of upper and lower pairs of horizontal side plates 22 and 23 respectively. The sprocket wheels 16 are keyed to an upper shaft 24, the ends of which are journaled in bushings 25 secured in a pair of open rectangular side frames 26 supported on a base 27 to which they are rigidly secured. The sprocket wheels 17 are keyed to a lower shaft 28 journaled in bushings 29 mounted in vertical guide slots 30 in the side frames 26.

To raise and lower the bushings 29 in the guide slots 30 to vary the convergence of the belts 6 and 7 and support said bushings in different positions, there is mounted in bores in the side frames 26 a pair of vertically movable pins 31 which are supported on cam blocks 32 mounted for horizontal sliding movement in slots 33 formed in said frame. To adjust the cam blocks 32 and hold the same in different positions, screws 34 held against endwise movement are loosely mounted in the respective ends of the side frames 26 and have screw-threaded engagement with said cam blocks. The ends of the side plates 22 and 23, at the delivery end of the machine, are mounted on the inner projecting ends of the bushings 25 and 29, respectively. The other ends of the side plates 22 are secured to the side frames 26 by upper and lower pairs of clamping screws 35 which have screw-threaded engagement with said side plates and project through vertical slots 36 in the side frames 26 to permit the respective ends of the side plates 22 to be raised or lowered, for a purpose that will presently appear. Upper and lower pairs of screws 37 connect the other ends of the side plates 23 to the side frames 26 and loosely extend through bores in said side plates to permit very slight sliding movements of the screws 37 in a horizontal plane during the adjustment of the shaft 28 by the cam blocks 32.

Belt tighteners in the form of stems 38 attached to the shafts 18 and 19 project radially therefrom and extend horizontally through the slots 30 and 31 and bores in the respective ends of the side plates 22 and 23, and have their outer ends screw-threaded to receive nuts 39 which impinge against said side plates as a base of resistance. Obviously by tightening the nuts 39 on the stems 38, the shafts 18 and 19 may be moved in the slots 20 and 21, respectively, to tighten the belts 6 and 7.

The opposing faces of the belts 6 and 7 are in converging relation in respect to the delivery end of the machine, and the cutting blades 11, 12 and 13 of said two belts are arranged in aligned cooperating pairs, and the convergence of said belts is such that cooperating teeth in passing through a plane projected through the axes of the shafts 24 and 28 touch or substantially touch. The cooperating pairs of the cutting blades at the receiving end of the machine are so spaced as to receive therebetween a strip of candy, and which strip is carried between the opposing faces of the belts 6 and 7 by the cooperating cutting blades and gradually cut until the candy passes between the last pair of aligned cutting blades at the delivery end of the machine where the final cutting action of the candy strip into pieces takes place. This gradual approach of the cooperating blades as the opposing faces of the belts move toward the delivery end of the machine is highly important for the reason that the gradual cutting action of the cooperating cutting blades closes the ends of the pieces of candy which usually contain a filler that is more plastic than the outer shell.

By adjusting the screws 25 in the slots 26, the end of the belt 6, at the receiving end of the machine, may be raised or lowered to vary the divergence of the opposing faces of the belts, and by adjusting the cam blocks 32, the end of the belt 7, at the delivery end of the machine, may be raised or lowered to vary the approach of cooperating teeth at the delivery end of the machine, which is highly important to properly adjust said teeth either during the assembly of the machine or to compensate for wear or the sharpening of the cutting blades.

To support and guide the belts 6 and 7 in addition to the sprocket wheels 14, 15, 16 and 17, there is formed in the side plates 22 and 23 endless guides 40 over which the projecting ends of the pins 10 travel. The horizontal portions of these guides 40 are in the form of channels which hold the hinge pins 10 to prevent spreading of the opposing faces of the belts 6 and 7 during the feeding and the cutting of the candy therebetween, and they also hold said hinge pins to prevent rocking of the link bars 8 thereon. This holding of the link bars 8 is highly important as it keeps cooperating cutting blades at the opposing faces of the belts properly aligned to increase the efficiency of the cutting action thereof.

To positively drive the belt 6 there is keyed to the left-hand end of the shaft 24 a pulley 41 onto which may be shifted a driving belt 42 from an idle pulley 43 loose on said shaft. As one means of shifting the belt 42 from one pulley to the other, there is provided a rock shaft 44 to one end of which is secured a radially projecting arm 45 having at its free end a laterally projecting shipper fork 46 for the belt 42. To the other end of the rock shaft 44 is secured a hand lever 47 by which the rock shaft may be operated. A pair of laterally spaced stop lugs 48 on a T-post 49 limit the movement of the hand lever 47 to properly position the belt 42 on either of the pulleys 41 or 43. The T-post 49 is secured to a bracket 50 in which the rock shaft is journaled, and which bracket is secured to the base 27.

To positively drive the belt 7 in respect to the belt 6 there is keyed to the right-hand end of the shaft 24 a spur gear 51 which meshes with a spur gear 52 having a flanged hub 53 to which it is circumferentially adjusted, and which hub is keyed to the shaft 28. A pair of diametrically opposite clamping screws 54 extend through circumferentially extended slots 55 in the flange of the hub 53 and have screw-threaded engagement with the gear 52 to adjustably connect the same to the hub 53. To circumferentially move the gear 52 in respect to its hub 53, a pair of opposing adjusting screws 56 are mounted in a pair of circumferentially spaced lugs on the flange of the hub 53 and impinge against opposite sides of a post 57 projecting from the outer face of the gear 52. Obviously, by circumferentially adjusting the gear 52 on the hub 53, the shaft 28 may be rotated in respect to the shaft 24 to move the belt 7 either forward or backward in respect to the belt 6 to cause the cooperating cutting blades to align as they pass through a vertical plane which extends through the axes of said shafts.

A cover 58 is supported on the side frames 26 and detachably held by dowel pins 59. An inclined apron 60 is secured to the side frames 26 at the receiving end of the machine to direct a strip of candy between the cooperating cutting blades, and a plurality of upright posts 61 are secured to the upper end of said apron between any two of which a strip of candy may be fed to cause the same to be acted upon either by the left-hand, right-hand or intermediate longitudinally spaced cutting portions of the blades, depending on the length in which it is desired to cut the pieces from the strip of candy.

To remove one of the hinge pins 10 from either of the belts to separate the same so that the same can be removed from the machine, there is formed in each pair of side plates 22 and 23, aligned bores 62 through which pins aligned therewith may be endwise removed. An endless canvas conveyor belt 63 is arranged to run over the base 27 to remove the pieces of candy as they are cut from the strip passing through the machine.

From the above description it is evident that by positively driving both of the belts 6 and 7 and by longitudinally adjusting one thereof, to wit, 7, in respect to the other, at the delivery end of said machine, the cooperating cutting blades at said end of the machine, which completes the final cutting of the strip of candy, may be always kept in align irrespective of the position of the other pairs of cooperating cutting blades.

What I claim is:

1. A machine of the kind described including two endless link belts arranged with opposing faces, hinge pins connecting the belt links and projecting beyond the sides thereof, guides for the projecting ends of said hinge pins serving to hold the belts for proper travel at their opposing faces, and co-operating cutting blades at the belt links.

2. The structure defined in claim 1 in which the hinge pins and co-operating guides hold the belts from spreading at their opposing faces.

3. The structure defined in claim 1 in which the hinge pins and co-operating guides hold the belt links from rocking at their opposing faces.

4. A machine of the kind described including two endless link belts arranged with opposing faces, hinge pins connecting the belt links and projecting beyond the sides thereof, plates having converging guide channels for the projecting ends of said hinge pins to hold the belts for proper travel at their opposing faces, and co-operating cutting blades on the belt links.

5. A machine of the kind described including two endless link belts arranged with opposing faces, hinge pins connecting the belt links and projecting beyond the sides thereof, said hinge pins being free for endwise removal from the belt links, plates having endless guides for the projecting ends of the hinge pins and holding the same against endwise removal, certain sections of said guides being in the form of channels to hold the belts for proper travel at their opposing faces, and co-operating cutting blades on the belt links.

6. The structure defined in claim 5 in which the guide for the hinge pins of each belt has an aperture through which any one of the respective hinge pins can be endwise moved.

7. A machine of the kind described including two endless link belts arranged with opposing faces, the links of the belts being in the form of interchangeably usable bars, removable hinge pins connecting the bars, guides for the hinge pins during their travel at the opposing faces of the belts, and cooperating cutting blades on the bars of different transverse lengths affording differently longitudinally spaced cutting blade portions.

8. A machine of the kind described including two endless link belts arranged with opposing faces, said links being in the form of interchangeably usable bars having on each of their sides a plurality of endwise spaced hinge lugs, the hinge lugs on each side of each bar being endwise offset in respect to the hinge lugs on the other side thereof to receive the hinge lugs of adjacent bars and permit said bars to be assembled end for end, either end at a given side of the belt, removable hinge pins connecting the hinge lugs of adjacent bars, guides for the hinge pins during their travel at the opposing faces of the belts, and cooperating cutting blades on the bars.

9. A machine of the kind described including two endless link belts arranged with opposing faces, pairs of laterally spaced side plates between which the belts travel, pairs of sprocket wheels at the receiving and delivery ends of the machine, removable hinge pins connecting the links of the belt and arranged to run over said pairs of sprocket wheels, endless guides in the side plates for the ends of the hinge pins which prevent the belts from spreading at their opposing faces and the links from rocking on the hinge pins and also hold said hinge pins against endwise movement, and cooperating cutting blades on the links.

In testimony whereof I affix my signature.

EDWARD G. OSZMAN.